(12) United States Patent
Muhammad et al.

(10) Patent No.: US 9,616,941 B2
(45) Date of Patent: Apr. 11, 2017

(54) TWO-PIECE LIGHTWEIGHT METAL-POLYMER HYBRID STRUCTURES

(71) Applicant: GM GLOBAL TECHNOLOGY OPERATIONS LLC, Detroit, MI (US)

(72) Inventors: Hanif Muhammad, Ann Arbor, MI (US); Nilesh D. Mankame, Ann Arbor, MI (US); Jan H. Aase, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 14/597,176

(22) Filed: Jan. 14, 2015

(65) Prior Publication Data

US 2016/0200370 A1    Jul. 14, 2016

(51) Int. Cl.
| | |
|---|---|
| *B62D 29/00* | (2006.01) |
| *B62D 21/15* | (2006.01) |
| *B60R 19/03* | (2006.01) |
| *B62D 65/02* | (2006.01) |
| *B60R 19/18* | (2006.01) |

(52) U.S. Cl.
CPC ............ *B62D 29/001* (2013.01); *B60R 19/03* (2013.01); *B60R 19/18* (2013.01); *B62D 21/15* (2013.01); *B62D 65/02* (2013.01); *B60R 2019/1833* (2013.01); *B60R 2019/1846* (2013.01)

(58) Field of Classification Search
CPC ...... B62D 65/02; B62D 21/15; B62D 29/001; B60R 19/03; B60R 19/18
See application file for complete search history.

(56) References Cited

U.S. PATENT DOCUMENTS 6,474,726 B1 * 11/2002 Hanakawa ............. B62D 25/04
296/187.12

* cited by examiner

*Primary Examiner* — Glenn Dayoan
*Assistant Examiner* — Melissa A Black
(74) *Attorney, Agent, or Firm* — John A. Miller; Miller IP Group, PLC

(57) ABSTRACT

An approach to designing lightweight metal-polymer composite structures in a manner that decomposes the structure into at least two parts. In one specific embodiment, the approach is a manufacturing process for a vehicle that includes attaching an impact beam to a vehicle structure. The process includes providing a vehicle structure including a back plate of the impact beam being made of a suitable material, such as a metal, that can withstand high temperature processes. A front part of the impact beam including a front plate and a polymer core is attached to the back plate. The back plate is designed to provide structural integrity that allows the vehicle structure to go through the high temperature processes and/or the vehicle structure provides structural integrity that allows the back plate to go through the one or more processes. The back plate is also designed to provide desired functional characteristics of the beam.

23 Claims, 2 Drawing Sheets

TWO-PIECE LIGHTWEIGHT METAL-POLYMER HYBRID STRUCTURES

BACKGROUND OF THE INVENTION

Field of the Invention

This invention relates generally to a method for assembling structures and, in one particular embodiment, to a method for providing a beam on a vehicle, where the method includes providing a back plate of the beam made of metal that is attached to a vehicle frame structure, subjecting the frame structure to high temperature processes, and then attaching a front assembly of the beam to the back plate after the high temperature processes are complete, where the back plate is designed to provide structural integrity that allows the vehicle frame structure to go through the high temperature processes and/or the vehicle frame structure provides structural integrity that allows the back plate to go through the one or more processes, and where the back plate is also designed to provide desired functional characteristics of the beam.

Discussion of the Related Art

Modern vehicles are equipped with a number of impact beams that provide structural integrity against collisions and impacts with objects, such as other vehicles. More particularly, impact beams are traditionally used in vehicle designs to protect occupants from front, side and/or rear impacts by absorbing energy through deformation in the event of a vehicle crash and distributing the applied dynamic loads to other energy absorbing sub-systems on the vehicle. For example, it is known to provide impact beams in a front energy management or bumper assembly, a rear energy management or bumper assembly and side impact assemblies on a vehicle. Impact beams at the front and rear of the vehicle are usually referred to as bumper beams, and impact beams on the sides of the vehicle are sometimes referred to as anti-intrusion bars.

In all cases, it is desirable to provide an impact beam with low mass, high flexural stiffness and strength, and high energy absorption per unit mass. The lightweight requirement is predicated by fuel economy standards and the fact that impact beams are located both very close to and very far from the vehicle's center of mass. Maximizing the flexural stiffness and strength is necessary if the beam is to survive low speed impacts without damage and transfer impact loads throughout the duration of a high speed impact event. Further, a high level of energy absorption translates into reduced load transfer to the occupants of the vehicle, thus increasing safety.

In one known vehicle front energy management system, an impact beam is comprised of a top and bottom facesheet in combination with an internal structural core for providing high energy impact resistance in a light weight and cost effective manner. Typically, the impact beam for such a system includes aluminum, steel, carbon fiber, etc. layers that are extruded, roll-formed, etc. A hard energy absorbing layer may be formed on the impact beam having the general shape of an outer fascia trim panel on the side closer to the fascia and that of the front face of the impact beam on the side closer to the impact beam. A soft energy absorbing layer is then formed on the hard energy absorbing layer and the front fascia panel is then provided over the soft energy absorbing layer. The combination of the hard energy absorbing layer and the soft energy absorbing layer provides a transition between the impact beam and the front fascia panel so as to allow the system to conform to the desired shape of the front fascia panel which may have significant angles and forms required by the vehicle styling. The hard energy absorbing layer and the soft energy absorbing layer also provide a transition between the fascia panel and the impact beam to effectively absorb low speed impacts without compromising system integrity.

It is known in the art to provide vehicle impact beams that are sandwich structures having a thermoplastic core. These prior art impact beams can generally be categorized into three designs, namely, hollow beams that are fully or partially reinforced with a polymer or metallic foam, single or dual-sided facesheets reinforced with a honeycomb-like cellular core, and formed composite impact beams. For hollow metallic or polymer matrix composite tube structures, which are fully or partially reinforced with a lightweight foam core, the material used for the core can be either a metallic or polymeric foam that is bonded, mechanically attached or interference fit into the tube structure. The purpose of the core is to carry shear loads in the sandwich structure and absorb energy in the event of a low or high speed impact, which is a distinction dependent on the density and composition of the foam. The use of honeycomb or honeycomb-like ordered cellular cores to provide reinforcement to one or two flat facesheets have an open-sided sandwich designs and have honeycomb, discrete-stiffened or wine-crate structures extending from the front face of the impact beam back towards the passenger compartment of the vehicle. If a second facesheet is not included between the core and the passenger compartment, then the core material must be relatively dense since it provides most of the flexural stiffness to the structure adjacent to the shear load transfer.

The manufacturing process of a vehicle typically includes first fabricating a vehicle structure, frame or chassis, sometimes referred to as a body-in-white (BIW), that includes a special configuration of structural metal beams, members, elements, etc. secured together, such as by bolts, welding, glue, etc., that provides the structural foundation to which the other vehicle components are mounted. Once the BIW structure is assembled, it is further processed through various fabrication steps, such as pretreatment (PT) steps including de-greasing, phosphate conversion coating, etc., electrophoretic painting (ELPO), primer, paint, etc. However, some of the structural elements in the BIW structure do not require these processes, but are put through these processes because they are part of the BIW structure, which reduces manufacturing costs. Some of these processes are high temperature processes, for example, ELPO drying is performed in an oven that runs at temperatures of 170°-200° C. Because the elements of the BIW structure are made of metal, theses temperatures do not cause any adverse affects to the structure.

In one known vehicle design, a front vehicle bumper assembly of the vehicle is mounted to ends of vehicle side rails as part of the BIW structure that is subjected to the high temperature manufacturing processes. In that design, the front bumper assembly is entirely made of metal making it able to withstand the high temperature processes. However, as discussed above, vehicle manufacturers are moving towards making various vehicle impact beams as sandwich structures having thermoplastic parts. Most thermoplastic materials will lose their structural integrity and melt at temperatures above, for example, 150° C., thus making them unusable as part of an impact beam for a BIW. Alternatives can be provided, including making the thermoplastic core out of a high cost thermoset material that can stand the high BIW processing temperatures. However, this adds significant and undesirable cost to the manufacturing process.

Further, it is possible to provide a temporary beam member in place of the sandwich structure during the BIW fabrication process, which can later be removed during assembly and replaced with the sandwich structure. However, this process also adds undesirable cost to the manufacturing process.

SUMMARY OF THE INVENTION

The present invention discloses an approach to designing lightweight metal-polymer composite structures in a manner that decomposes the structure into at least two parts. In one specific embodiment, the disclosure describes a manufacturing process for a vehicle that includes attaching a beam to a vehicle structure. The process includes attaching a back plate of the beam to the structure, where the back plate is made of a suitable material, such as a metal, that can withstand high temperature processes. Once the back plate is provided as part of the structure, the vehicle structure is processed through the high temperature processes, and then a front part of the beam including a front plate and a polymer core is attached to the back plate. The back plate is designed to provide structural integrity that allows the vehicle structure to go through the high temperature processes and/or the vehicle structure provides structural integrity that allows the back plate to go through the one or more processes. The back plate is also designed to provide desired functional characteristics of the beam.

Additional features of the present invention will become apparent from the following description and appended claims, taken in conjunction with the accompanying drawings.

DETAILED DESCRIPTION OF THE EMBODIMENTS

Figure 1:
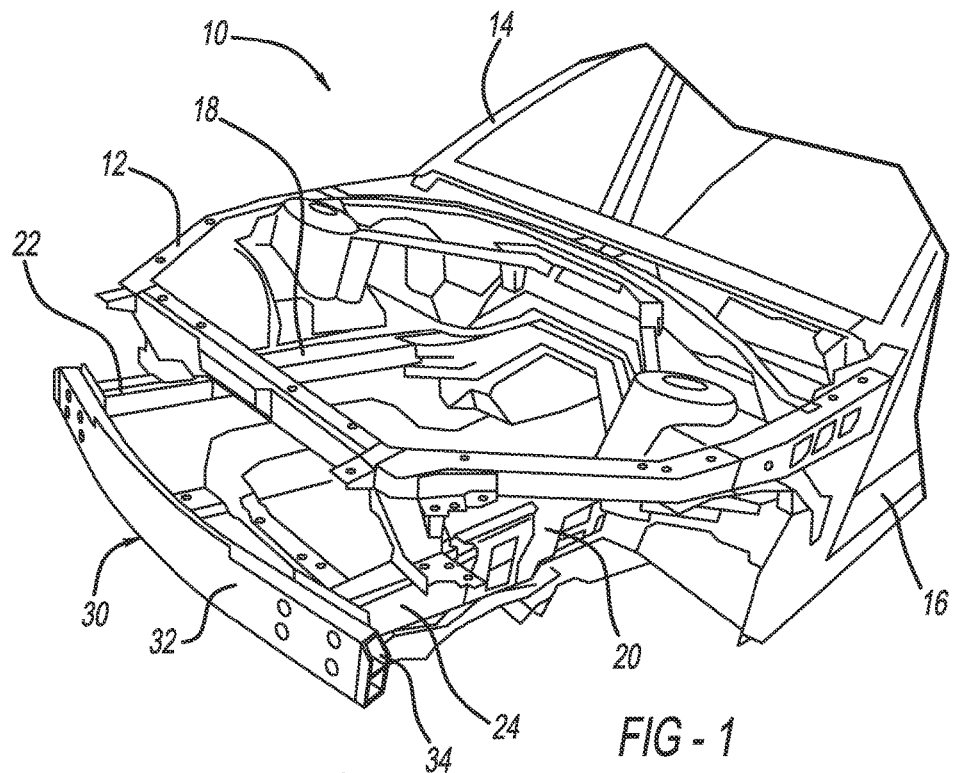
FIG. 1 is a cut-away, isometric view of a front portion of a vehicle structure.

The following discussion of the embodiments of the invention directed to a process for fabricating a multi-piece vehicle structural beam is merely exemplary in nature, and is in no way intended to limit the invention or its applications or uses.

The present invention discloses an approach to designing lightweight metal-polymer composite structures in a manner that decomposes the structure into at least two parts, namely, for example, a metal only part that can survive high temperatures associated with some manufacturing processes and that is needed to provide sufficient structural integrity to go through these processes, and a second part that includes materials that cannot withstand the high temperature processes. This decomposition of the structure accounts for the assembly sequence in which the two parts are combined into a functional structure in a manner that does not expose the second part to the high temperature processes, while still providing sufficient structural integrity to the overall assembly as it progresses through the manufacturing process. Although high temperature processes are mentioned, other material degrading processes, such as acid baths, may be employed.

The process referred to above results in lightweight metal-polymer hybrid structures that can be processed in conventional automotive manufacturing plants without disrupting the traditional assembly sequence. Although the discussion herein is specific to an automobile manufacturing process, other non-automotive assembly processes may benefit from the present invention, such as aerospace process, building construction processes, etc.

In one embodiment, the present invention proposes a manufacturing and assembly process for a vehicle that includes securing a vehicle beam, such as an impact beam, for example, a front bumper assembly, to the vehicle. The beam is a metal-polymer hybrid sandwich structure including a first part that is a back metal plate that is able to withstand the high temperatures of the BIW fabrication processes, and a second part that is a front assembly including a polymer insert, a front plate and possibly optional energy absorbing layers mounted to the front plate opposite to the back plate. The first part is designed to perform two functions. First, during the assembly process it contributes to the structural integrity of the BIW structure and provides the desired stiffness and strength for the structure when it goes through certain high temperature processes in the build sequence. Once both the parts are assembled to form a complete beam, the first part contributes to the stiffness, strength and other functional attributes of the complete beam. As the second part does not have to go through the high temperature processes in the build sequence, it can include thermoplastic materials that cannot be used in the first part due to their limited operating temperatures. Thermoplastic materials can reduce both the cost and the mass of the complete beam. Thus, decomposing the overall beam design into two parts allows the realization of a lower mass and, potentially a lower cost beam.

It is noted that although the process discussed above includes two parts, other embodiment may require more than two parts to achieve compatibility with a given assembly sequence such that for each stage of the sequence the partially complete structure has sufficient structural integrity for the process. Further, the first part does not need to be a metal part. For example, if the assembly sequence first includes an acid bath that attacks an aluminum plate, the first part may be a polymer able to withstand such a bath.

FIG. 1 is a cut-away, isometric view of a known body-in-white (BIW) vehicle structure 10 including, for example, hood mounting beams 12, roof mounting beams 14, door mounting beams 16, etc. The vehicle structure 10 also include two parallel side rails 18 and 20 extending along the length of the vehicle each including a crush can 22 and 24 mounted to a front end of the side rails 18 and 20, respectively. A front bumper impact beam 30 is mounted to ends of the crush cans 22 and 24 opposite to the side rails 18 and 20. The impact beam 30 is an assembly of opposing metal panels 32 and 34 that are welded together in a particular curved configuration for the particular vehicle. The impact beam 30 is provided as part of the structural elements of the vehicle structure 10 in this design because it adds structural integrity and rigidity to the vehicle structure 10, such as by coupling ends of the rails 18 and 20 together, which help provide the desired rigidity for the vehicle assembly process. The BIW structure 10 is exposed to various coating processes, such as PT, ELPO, primer and paint, which may require oven drying at high temperatures, as discussed above. However, as also discussed above, some modern vehicle designs would benefit from replacing the all metal impact beam 30 with a sandwich-type structure including a polymer insert provided between two facesheets.

Figure 2:
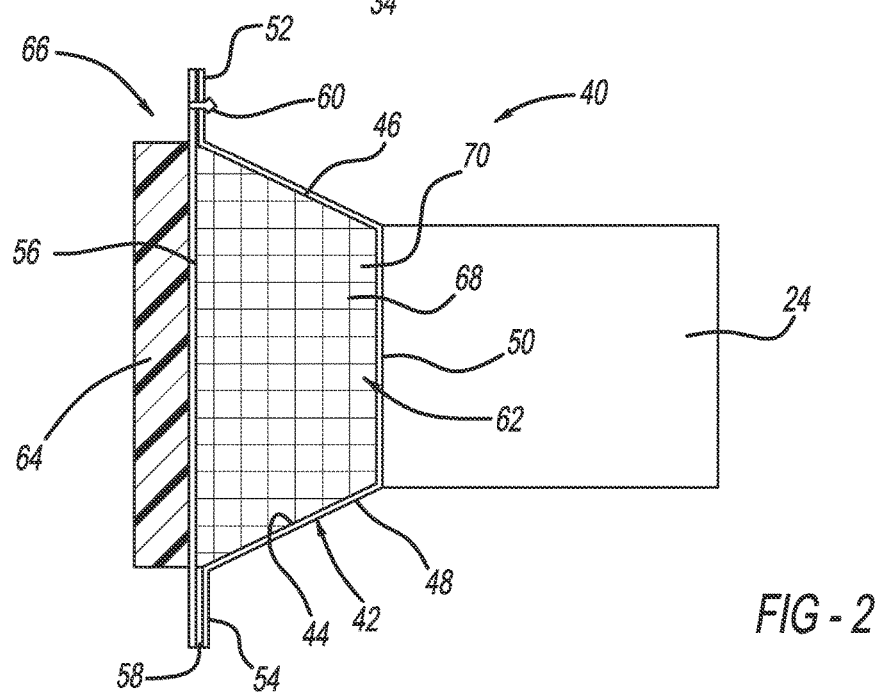
FIG. 2 is a cross-sectional view of a two-piece metal-polymer hybrid impact beam for a vehicle.

FIG. 2 is a cross-sectional view of a two-piece impact beam 40 that illustrates one example of a type of sandwich structure that can be employed as the front impact beam of a vehicle, and can replace the impact beam 30. The impact beam 40 includes a back metal plate 42 rolled or formed to define a channel 44 having sidewalls 46 and 48 and bottom portion 50. A mounting flange 52 extends from the sidewall 46 and a mounting flange 54 extends from the sidewall 48, as shown. The impact beam 40 also includes a front assembly 66 having a flat front plate 56 mounted to the flanges 52 and 54 by any suitable fastening device, such as an adhesive layer 58, rivets 60, bolts, welds, etc. The beam 40 also includes a polymer insert 62 positioned within the channel 44 and an optional front show piece 64, such as a fascia, hard energy absorbing (EA) layer, soft EA layer, etc. The polymer insert 62 is a honeycomb or open type structure including struts 68 and open spaces 70, and can be any suitable polymer structure for a particular impact beam design, for example, an injection molded thermoplastic piece providing any configuration of structural members and voids, and can be made by any suitable thermoplastic forming process. The insert 62 can be secured to the front plate 56 in any suitable manner, such as by a suitable adhesive, micro-truss fabrication, bolts, etc. The polymer insert 62 can include stiffener inserts, such as structural polymer foams, polymer honeycombs, etc., stand-offs for fastener connections, etc.

It is generally desirable that the impact beam 40 be provided to the BIW structure assembly location of the vehicle as a complete structure. However, if it is necessary that the impact beam 40 provide structural integrity for the BIW structure of the vehicle, such as provided by the impact beam 30 shown in FIG. 1, this type of impact beam including a polymer core or insert cannot be employed because the insert 62 cannot withstand the processing and drying temperatures of the BIW manufacturing processes as described above. In order to overcome this limitation, the present invention proposes separating the impact beam 40 into the two parts as described, namely, the back plate 42 and the front assembly 66 that are attached to the vehicle at different points in the build sequence. In this design, the back plate 42 is mounted to the crush cans 22 and 24 through welding or other suitable attachment mechanisms as part of the BIW structure 10. The back plate 42 has the necessary thickness, metal performance, rigidity, etc. suitable to provide the desired structural integrity for the BIW structure 10, such as the necessary rigidity against torsional forces. Once the BIW structure 10 has gone through the high temperature manufacturing processes, the front assembly 66 of the impact beam 40 can then be secured to the back plate 42 as discussed above.

Figure 3:
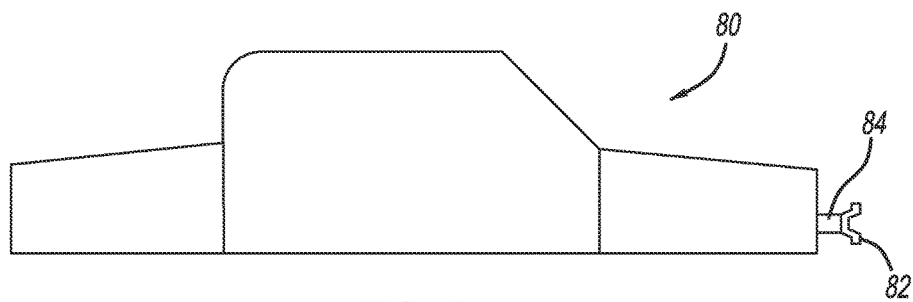
FIGS. 3-5 are simple illustrations showing the assembly sequence for installing the two-piece beam on a vehicle.
Figure 4:
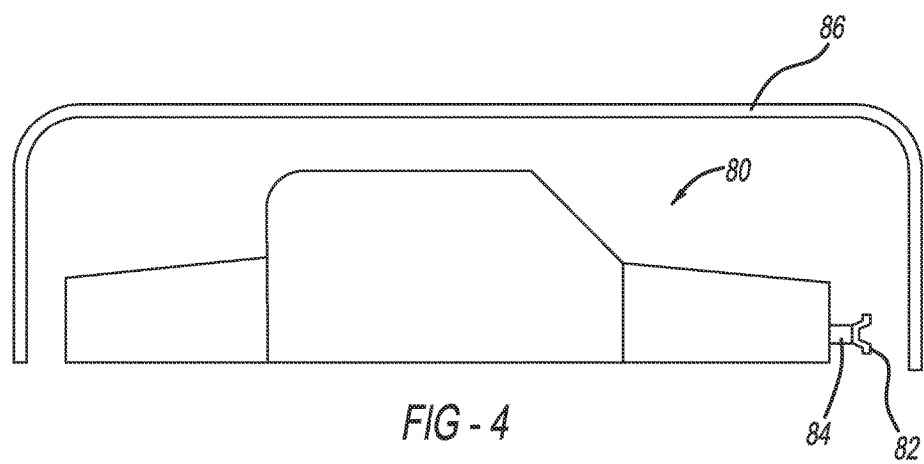
Figure 5:
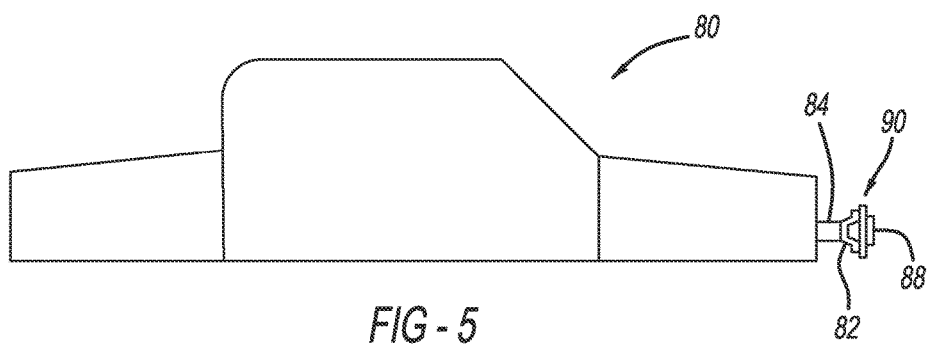

FIGS. 3-5 show simplified illustrations of this described manufacturing process for a vehicle. Particularly, FIG. 3 shows a side view illustration of a BIW structure 80 including a back plate 82 for a front impact beam mounted to a crush can 84. Once the various structural components of the BIW structure 80 have been provided and the structure 80 is ready for high temperature PT, ELPO, primer and paint processes, the structure 80 is positioned within a high temperature oven 86 to perform these high temperature processes, as shown in FIG. 4. Once the BIW structure 80 has been painted and dried, then an assembly step is performed to secure a front assembly 88 to the back plate 82 to provide a front impact beam 90, as shown in FIG. 5.

As discussed above, the back plate 42 is designed to satisfy both the structural requirements of the BIW structure 10 during the assembly process and the structural requirements of the impact beam in combination with the front assembly 66 when the assembly of the back plate 42 and the assembly 66 is complete. Alignment features can be provided in the front assembly 66 and the back plate 42 to expedite assembly. Also, design considerations and features can be employed to provide a clearance fit for the front assembly 66 to the back plate 42 during assembly after the BIW structure 10 is manufactured. For example, over-sized holes can be provided in the front plate 56 in the Y (cross-car) and Z (vertical) directions so that when the front assembly 66 is mounted to the back plate 42 distortion of the back plate 42 is avoided during assembly of the impact beam 40.

The back plate 42 may get distorted during the high temperature processes due to thermal expansion and contraction. A fixture/alignment device (not shown) can be provided on the assembly line to reconfigure the back plate 42 to its nominal design configuration when the front assembly 66 is being mounted to the back plate 42. The attachments between the back plate 42 and the rest of the BIW structure 10 can be reconfigured at this point in the assembly. The front assembly 66 is then assembled to the back plate 42 as discussed above using adhesive bonding, riveting, fasteners, low energy welding, etc., and then the fixture/alignment device can be removed.

The discussion above is specific to an impact beam for a front bumper assembly of a vehicle. However, the same design considerations can be provided for other parts of the BIW structure 10 that may benefit from a sandwich structure including a polymer insert, where that polymer insert cannot be provided as part of the assembly when it is subjected to the high temperature fabrication processes. Other places for such sandwich structures in the BIW structure 10 may include roof bows, floor panels, hood structures, tie bars, etc.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for manufacturing a vehicle, said method comprising:
   providing a vehicle structure including a configuration of metal structural elements, wherein at least one of the structural elements is a back plate that is part of a beam;
   performing one or more processes to the vehicle structure that requires high temperature, wherein the back plate is designed to provide structural integrity that allows the vehicle structure to go through the one or more processes and/or the vehicle structure provides structural integrity that allows the back plate to go through the one or more processes; and
   mounting a front assembly that is part of the beam to the back plate after the high temperature process, where the front assembly includes a front plate mounted to the back plate and a polymer insert positioned between the front plate and the back plate, wherein the back plate is also designed to provide desired functional characteristics of the beam, and where alignment elements are provided in the front assembly and in the back plate, said alignment elements being adjustable in vertical and lateral directions, and any high temperature process-induced distortion of the back plate is removed prior to mounting the front assembly to the back plate using the alignment elements.

2. The method according to claim 1 wherein the processes include one or more of pretreatment (PT), electrophoretic painting (ELPO), primer and paint processes.

3. The method according to claim 1 wherein providing a vehicle structure includes providing a body-in-white (BIW) structure.

4. The method according to claim 3 wherein the back plate is mounted to crush cans extending from an end of side rails in the BIW structure.

5. The method according to claim 1 wherein mounting the front assembly to the back plate includes using a technique selected from the group consisting of adhesives, rivets, bolts and welds.

6. The method according to claim 1 wherein the front assembly includes an impact layer mounted to the front plate opposite to the insert.

7. The method according to claim 1 wherein the polymer insert is a thermoplastic insert.

8. The method according to claim 1 wherein the back plate is configured to have a bottom portion and side walls that define a trough in which the polymer insert is positioned and flanges to which the front plate is mounted.

9. The method according to claim 1 wherein the beam is an impact beam that is part of a front bumper.

10. The method according to claim 1 wherein the beam is selected from the group consisting of roof bows, floor panels, hood structures and tie bars.

11. A method for manufacturing a vehicle, said method comprising:
providing a body-in-white (BIW) structure including a configuration of metal structural elements, wherein at least one the structural elements is a back plate that is part of a front impact beam;
performing one or more BIW processes to the BIW structure that requires high temperature, wherein the back plate is designed to provide structural integrity that allows the BIW structure to go through the one or more BIW processes and/or the BIW structure provides structural integrity that allows the back plate to go through the one or more processes; and
mounting a front assembly that is part of the impact beam to the back plate after the high temperature process, where the front assembly includes a front plate mounted to the back plate and a thermoplastic insert positioned between the front plate and the back plate, wherein the back plate is configured to have a bottom portion and side walls that define a trough in which the thermoplastic insert is positioned and flanges to which the front plate is mounted, and wherein the back plate is also designed to provide desired functional characteristics of the impact beam, and where alignment elements are provided in the front assembly and in the back plate, said alignment elements being adjustable in vertical and lateral directions, and any high temperature process-induced distortion of the back plate is removed prior to mounting the front assembly to the back plate using the alignment elements.

12. The method according to claim 11 wherein the BIW processes include one or more of pretreatment (PT), electrophoretic painting (BYO), primer and paint processes.

13. The method according to claim 11 wherein the back plate is mounted to crush cans extending from an end of side rails in the BIW structure.

14. The method according to claim 11 wherein mounting the front assembly to the back plate includes using a technique selected from the group consisting of adhesives, rivets, bolts and welds.

15. A method for fabricating a composite structure, said method comprising:
providing one or more manufacturing processes that may have a degrading effect on manufacturing parts;
providing a first part that can withstand the degrading effect of the one or more manufacturing processes;
providing a second part that cannot withstand the effects of the one or more manufacturing processes; and
coupling the second part to the first part to form the composite structure after the first part has gone through the one or more manufacturing processes, where alignment elements are provided in the first part and in the second part, said alignment elements being adjustable in both in-plane directions relative to the first part, and any manufacturing process-induced distortion of the first part is removed prior to mounting the second part to the first part using the alignment elements.

16. The method according to claim 15 wherein the first part is mounted to an assembly structure before being subjected to the one or more manufacturing processes, and wherein the first part is designed to provide structural integrity that allows the assembly structure to go through the one or more manufacturing processes and/or the assembly structure provides structural integrity that allows the first part to go through the one or more manufacturing processes, and wherein the first part is also designed to provide desired functional characteristics of the composite structure.

17. The method according to claim 15 wherein providing one or more manufacturing processes includes providing one or more high temperature manufacturing.

18. The method according to claim 15 wherein providing one or more manufacturing processes includes providing one or more acidic manufacturing.

19. The method according to claim 15 wherein providing a first part includes providing a metal part and providing a second part includes providing a non-metal part.

20. The method according to claim 16 wherein the first part includes a back plate and the second part includes a front plate and a polymer insert, and wherein coupling the first part to the second part includes mounting the front plate to the back plate so that the insert is positioned therebetween.

21. A vehicle beam comprising a back plate, a front plate mounted to the back plate and a thermoplastic insert positioned between the front plate and the back plate, wherein the back plate is configured to have a bottom portion and side walls that define a trough in which the thermoplastic insert is positioned and flanges to which the front plate is mounted, said back plate being designed and configured to provide desired structural integrity and stiffness requirements for the beam, and provide desired stiffness and strength for a body-in-white (BIW) structure including a configuration of metal structural elements when the BIW structure goes through assembly and high temperature fabrication processes, where alignment elements are provided in the front plate and in the back plate, said alignment elements being adjustable in vertical and lateral directions, and any high temperature process-induced distortion of the back plate is removed prior to mounting the front plate to the back plate using the alignment elements.

22. The beam according to claim 21 wherein the back plate is mounted to crush cans extending from an end of side rails in the BIW structure.

23. The beam according to claim 21 wherein the beam is an impact beam having an impact layer mounted to the front plate opposite to the insert.

* * * * *